United States Patent
Urmson et al.

(10) Patent No.: US 10,185,324 B1
(45) Date of Patent: Jan. 22, 2019

(54) BUILDING ELEVATION MAPS FROM LASER DATA

(71) Applicant: Waymo LLC, Mountain View, CA (US)

(72) Inventors: Christopher Paul Urmson, Mountain View, CA (US); Andrew Hughes Chatham, San Francisco, CA (US); Hendrik Dahlkamp, San Francisco, CA (US); Michael Steven Montemerlo, Mountain View, CA (US); Jiajun Zhu, Palo Alto, CA (US)

(73) Assignee: Waymo LLC, Mountain View, CA (US)

( * ) Notice: Subject to any disclaimer, the term of this patent is extended or adjusted under 35 U.S.C. 154(b) by 32 days.

(21) Appl. No.: 15/631,253

(22) Filed: Jun. 23, 2017

Related U.S. Application Data

(63) Continuation of application No. 14/452,894, filed on Aug. 6, 2014, now Pat. No. 9,709,679, which is a
(Continued)

(51) Int. Cl.
  *G01C 21/00* (2006.01)
  *G05D 1/02* (2006.01)
  (Continued)

(52) U.S. Cl.
  CPC ........... *G05D 1/0274* (2013.01); *G01C 21/32* (2013.01); *G05D 1/024* (2013.01); *G05D 2201/0213* (2013.01); *G09B 29/12* (2013.01)

(58) Field of Classification Search
  None
  See application file for complete search history.

(56) References Cited

U.S. PATENT DOCUMENTS

| 6,018,308 A | 1/2000 | Shirai |
| 6,347,264 B2 | 2/2002 | Nicosia et al. |

(Continued)

FOREIGN PATENT DOCUMENTS

WO  2011032207 A1  3/2011

OTHER PUBLICATIONS

G. Broten, J. Giesbrecht and S. Monckton, World Representation Using Terrain Maps, Dec. 2005, 44 pages.
(Continued)

*Primary Examiner* — Bhavesh V Amin
(74) *Attorney, Agent, or Firm* — Lerner, David, Littenberg, Krumholz & Mentlik, LLP

(57) ABSTRACT

Aspects of the present disclosure relate generally to generating elevation maps. More specifically, data points may be collected by a laser moving along a roadway and used to generate an elevation map of the roadway. The collected data points may be projected onto a two dimensional or "2D" grid. The grid may include a plurality of cells, each cell of the grid representing a geolocated second of the roadway. The data points of each cell may be evaluated to identify an elevation for the particular cell. For example, the data points in a particular cell may be filtered in various ways including occlusion, interpolation from neighboring cells, etc. The minimum value of the remaining data points within each cell may then be used as the elevation for the particular cell, and the elevation of a plurality of cells may be used to generate an elevation map of the roadway.

20 Claims, 10 Drawing Sheets

Related U.S. Application Data continuation of application No. 13/198,199, filed on Aug. 4, 2011, now Pat. No. 8,825,391.

(51) Int. Cl.
*G01C 21/32* (2006.01)
*G09B 29/12* (2006.01)

(56) References Cited

U.S. PATENT DOCUMENTS

| | | |
|---|---|---|
| 6,349,249 B1 | 2/2002 | Cunningham |
| 6,405,132 B1 | 6/2002 | Breed et al. |
| 6,526,352 B1 | 2/2003 | Breed et al. |
| 6,593,873 B2 | 7/2003 | Samukawa et al. |
| 6,631,324 B2 | 10/2003 | Okamura et al. |
| 6,768,944 B2 | 7/2004 | Breed et al. |
| 6,862,527 B2 | 3/2005 | Okamura et al. |
| 7,069,124 B1 | 6/2006 | Whittaker et al. |
| 7,110,881 B2 | 9/2006 | Gray et al. |
| 7,202,776 B2 | 4/2007 | Breed |
| 7,352,292 B2 | 4/2008 | Alter et al. |
| 7,706,978 B2 | 4/2010 | Schiffmann et al. |
| 7,822,266 B2 | 10/2010 | Wellington et al. |
| 8,050,863 B2 | 11/2011 | Trepagnier et al. |
| 8,126,642 B2 | 2/2012 | Trepagnier et al. |
| 8,239,084 B2 | 8/2012 | Yamamoto et al. |
| 2002/0049530 A1 | 4/2002 | Poropat |
| 2004/0158355 A1 | 8/2004 | Holmqvist et al. |
| 2005/0278098 A1 | 12/2005 | Breed |
| 2007/0219720 A1 | 9/2007 | Trepagnier et al. |
| 2008/0027591 A1 | 1/2008 | Lenser et al. |
| 2008/0161986 A1 | 7/2008 | Breed |
| 2008/0161987 A1 | 7/2008 | Breed |
| 2010/0030473 A1 | 2/2010 | Au et al. |
| 2010/0106356 A1 | 4/2010 | Trepagnier et al. |
| 2010/0121577 A1 | 5/2010 | Zhang et al. |
| 2010/0274430 A1 | 10/2010 | Dolgov et al. |
| 2011/0224840 A1 | 9/2011 | Vanek |
| 2011/0257949 A1 | 10/2011 | Vasudevan et al. |
| 2012/0033196 A1 | 2/2012 | Vanek et al. |

OTHER PUBLICATIONS

"Expectation—Maximization Algorithm" [online] [Retrieved Jul. 6, 2011] [Retrieved from the internet: <http://en.wikipedia.org/wiki/Expectation-maximization_algorithm>, 7 pages.

(meters)

BUILDING ELEVATION MAPS FROM LASER DATA

CROSS-REFERENCE TO RELATED APPLICATIONS

The present application is a continuation of U.S. patent application Ser. No. 14/452,894, filed Aug. 6, 2014, which is a continuation of U.S. patent application Ser. No. 13/198,199, filed Aug. 4, 2011, now U.S. Pat. No. 8,825,391, the disclosures of which is incorporated herein by reference.

BACKGROUND

Autonomous vehicles use various computing systems to aid in the transport of passengers from one location to another. Some autonomous vehicles may require some initial input or continuous input from an operator, such as a pilot, driver, or passenger. Other systems, for example autopilot systems, may be used only when the system has been engaged, which permits the operator to switch from a manual mode (where the operator exercises a high degree of control over the movement of the vehicle) to an autonomous mode (where the vehicle essentially drives itself) to modes that lie somewhere in between.

Such vehicles are equipped with various types of sensors in order to detect objects in the surroundings. For example, autonomous vehicles may include lasers, sonar, radar, cameras, and other devices which scan and record data from the vehicle's surroundings. These devices in combination (and in some cases alone) may be used to build elevation maps of the vehicle's surrounding.

BRIEF SUMMARY

One aspect of the disclosure provides a method for generating an elevation map of a roadway. The method includes receiving sensor data, the sensor data including a plurality of data points. Each of the plurality of data points represents a position and elevation of a particular location along the roadway. A processor generates a two-dimensional ("2D") grid of the roadway. The 2D grid includes a plurality of cells. Each cell of the plurality of cells represents an area of the roadway. The method also includes generating a first set of data points for each cell of the plurality of cells based on the positions of the plurality of data points and filtering the first set of data points for each cell of the plurality of cells in order to generate a second set of data points for each cell of the plurality of cells. For each cell of the plurality of cells, the method includes identifying a data point of the second set of data points associated with a lowest relative elevation. The elevation map of the roadway is generated based on the identified data points of the second sets of data points associated with the lowest relative elevations.

In one example, each of the plurality of cells has the same dimensions. In another example, at least two cells of the plurality of cells include different dimensions. In another example, the method also includes transferring the elevation to a vehicle in order to navigate the vehicle along the roadway. In another example, filtering the first set of data points for a particular cell of the plurality of cells in order to generate the second set of data points for the particular cell includes removing outlier points by interpolating data from a neighboring cell of the particular cell. In a further example, filtering the first set of data points for a particular cell of the plurality of cells in order to generate the second set of data points for the particular cell includes generating an approximate data point for the particular cell based on data from a neighboring cell of the particular cell. In this example, the first set of data points for the particular cell does not include any data points. In another example, filtering the first set of data points for a particular cell of the plurality of cells in order to generate the second set of data points for the particular cell includes filtering using an occlusion method. In another example, filtering the first set of data points for a particular cell of the plurality of cells in order to generate the second set of data points for the particular cell includes identifying two clusters of data points for the particular cell. In one alternative, the method also includes identifying a second data point of the second set of data points for the particular cell associated with a lowest relative elevation for a higher relative cluster of the two clusters. In this alternative, generating the elevation map of the roadway is also based on the second data point of the second set of data points.

Another aspect of the disclosure provides a device for generating an elevation map of a roadway. The device includes memory storing sensor data. The sensor data includes a plurality of data points. Each data point of the plurality of data points represents a position and elevation of a particular location along the roadway. The device also includes a processor coupled to the memory. The processor is operable to access the stored sensor data; generate a 2D grid of the roadway, where the 2D grid includes a plurality of cells, each cell represents an area of the roadway; generate a first set of data points for each cell of the plurality of cells based on the positions of the plurality of data points; filter the first set of data points for each cell of the plurality of cells in order to generate a second set of data points for each cell of the plurality of cells; for each cell of the plurality of cells, identify a data point of the second set of data points associated with a lowest relative elevation; and generate the elevation map of the roadway based on the identified data points of the second sets of data points associated with the lowest relative elevations.

In one example, processor is also operable to transfer the elevation to a vehicle in order to navigate the vehicle along the roadway. In another example, the processor is also operable to filter the first set of data points for a particular cell of the plurality of cells in order to generate the second set of data points for the particular cell by removing outlier points by interpolating data from a neighboring cell of the particular cell. In a further example, the processor is also operable to filter the first set of data points for a particular cell of the plurality of cells in order to generate the second set of data points for the particular cell by generating an approximate data point for the particular cell based on data from a neighboring cell of the particular cell. In this example, the first set of data points for the particular cell does not include any data points. In another example, the processor is also operable to filter the first set of data points for a particular cell of the plurality of cells to generate the second set of data points for the particular cell by identifying two clusters of data points for the particular cell. In a further example, the processor is also operable to identify a second data point of the second set of data points for the particular cell associated with a lowest relative elevation for a higher relative cluster of the two clusters. In this example, the processor generates the elevation map of the roadway based on the second data point of the second set of data points.

Yet another aspect of the disclosure provides a non-transitory, tangible computer-readable storage medium on which computer readable instructions of a program are stored. The instructions, when executed by a processor, cause the processor to perform a method of generating an elevation map of a roadway. The method includes receiving sensor data, the sensor data including a plurality of data points. Each of the plurality of data points represents a position and elevation of a particular location along the roadway. A processor generates a 2D grid of the roadway. The 2D grid includes a plurality of cells. Each cell of the plurality of cells represents an area of the roadway. The method also includes generating a first set of data points for each cell of the plurality of cells based on the positions of the plurality of data points and filtering the first set of data points for each cell of the plurality of cells in order to generate a second set of data points for each cell of the plurality of cells. For each cell of the plurality of cells, the method includes identifying a data point of the second set of data points associated with a lowest relative elevation. The elevation map of the roadway is generated based on the identified data points of the second sets of data points associated with the lowest relative elevations.

In one example, each of the plurality of cells has the same dimensions. In another example, at least two cells of the plurality of cells include different dimensions. In another example, the method also includes transferring the elevation to a vehicle in order to navigate the vehicle along the roadway. In another example, filtering the first set of data points for a particular cell of the plurality of cells in order to generate the second set of data points for the particular cell includes removing outlier points by interpolating data from a neighboring cell of the particular cell. In another example, filtering the first set of data points for a particular cell of the plurality of cells in order to generate the second set of data points for the particular cell includes generating an approximate data point for the particular cell based on data from a neighboring cell of the particular cell. In this example, the first set of data points for the particular cell does not include any data points. In another example, filtering the first set of data points for a particular cell of the plurality of cells in order to generate the second set of data points for the particular cell includes filtering using an occlusion method. In another example, filtering the first set of data points for a particular cell of the plurality of cells in order to generate the second set of data points for the particular cell includes identifying two clusters of data points for the particular cell. In one alternative, the method also includes identifying a second data point of the second set of data points for the particular cell associated with a lowest relative elevation for a higher relative cluster of the two clusters. In this alternative, generating the elevation map of the roadway is also based on the second data point of the second set of data points.

A further aspect of the disclosure provides a vehicle. The vehicle includes a braking system configured to decelerate the vehicle, an acceleration system configured to accelerate the vehicle, and a steering system configured to change a direction of motion of the vehicle. The vehicle also includes a processor configured to control the breaking, acceleration, and steering systems. The vehicle also includes memory coupled to the processor. The memory stores an elevation map. The elevation map is generated by receiving sensor data, the sensor data including a plurality of data points. Each of the plurality of data points represents a position and elevation of a particular location along the roadway. A 2D grid of the roadway is generated. The 2D grid includes a plurality of cells. Each cell of the plurality of cells representing an area of the roadway. The method also includes generating a first set of data points for each cell of the plurality of cells based on the positions of the plurality of data points and filtering the first set of data points for each cell of the plurality of cells in order to generate a second set of data points for each cell of the plurality of cells. For each cell of the plurality of cells, the method includes identifying a data point of the second set of data points associated with a lowest relative elevation. The elevation map of the roadway is then generated based on the identified data points of the second sets of data points associated with the lowest relative elevations. The processor is operable to access the elevation map from the memory and use the elevation map to navigate the vehicle along a route by controlling one or more of the braking, acceleration, and steering systems.

DETAILED DESCRIPTION

In one aspect of the disclosure, a computer may receive sensor data collected by a laser. The sensor data may include data points describing the location and elevation of particular locations along a roadway. A 2D grid of the roadway with a plurality of cells may be generated. Each cell of the plurality of cells may represent an area of the roadway. The data points may then be sorted into the cells based on their location, or a first set of data points for each cell of the plurality of cells may be generated based on the locations of the data points. The first set of data points for each cell may be filtered using various methods to generate a second set of data points for each cell. For each cell, a data point of the second set associated with a lowest relative elevation may be identified. The identified data points associated with the lowest relative elevation may be used to generate an elevation map of the roadway. The elevation map may be transmitted or otherwise transferred to a vehicle, in some examples an autonomous vehicle, in order to navigate or control aspects of the vehicle as it moves along the roadway.

Figure 1:
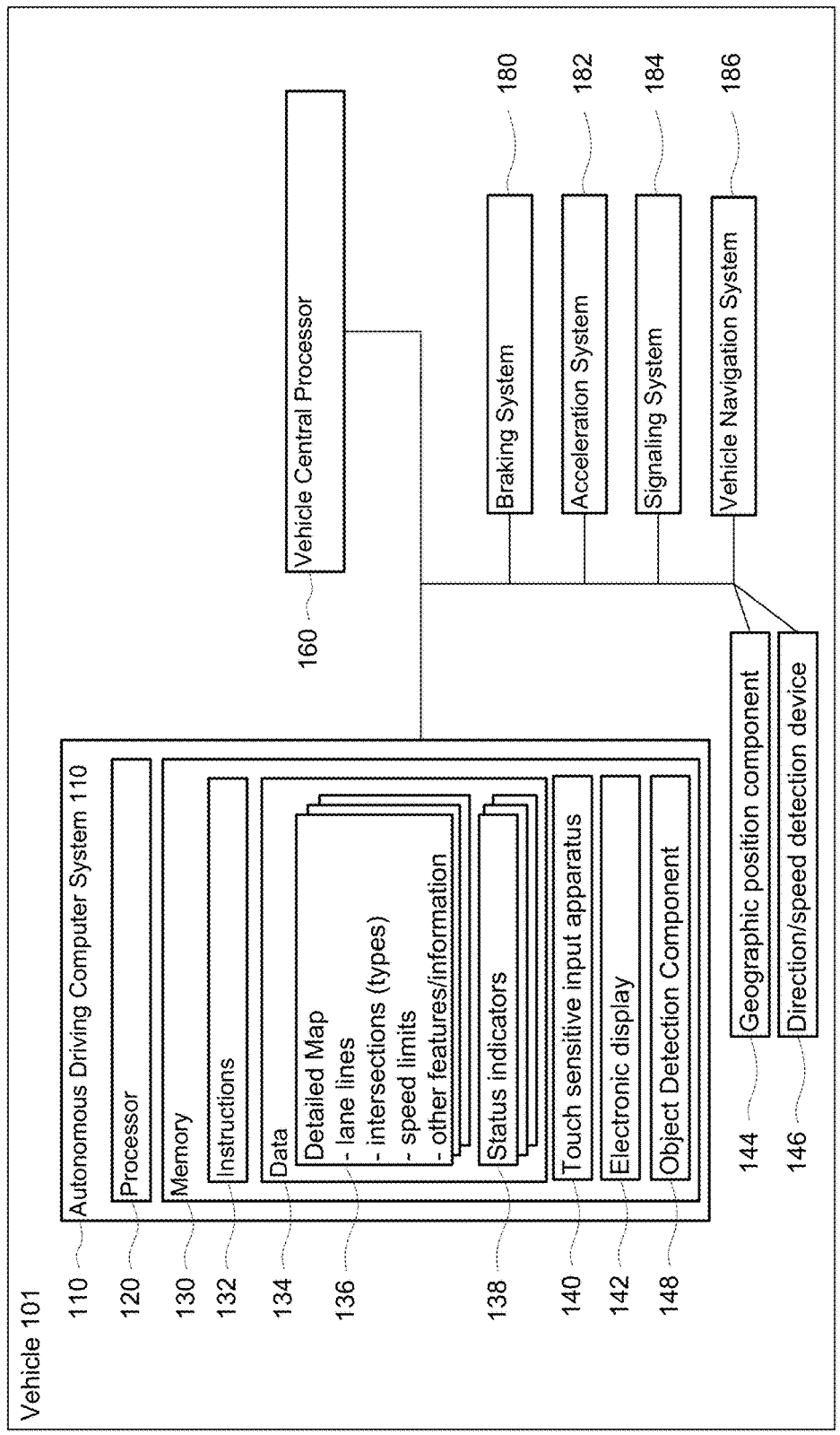
FIG. 1 is a functional diagram of a system in accordance with an exemplary embodiment.

As shown in FIG. 1, an autonomous driving system 100 in accordance with one aspect of the disclosure includes a vehicle 101 with various components. While certain aspects of the disclosure are particularly useful in connection with specific types of vehicles, the vehicle may be any type of vehicle including, but not limited to, cars, trucks, motorcycles, busses, boats, airplanes, helicopters, lawnmowers, farm equipment, warehouse equipment, recreational vehicles, amusement park vehicles, trams, golf carts, trains, and trolleys. The vehicle may have one or more computers, such as computer 110 containing a processor 120, memory 130 and other components typically present in general purpose computers.

The memory 130 stores information accessible by processor 120, including instructions 132 and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the system and method is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as commercial CPUs for personal computers. Alternatively, the processor may be a dedicated device such as an ASIC. Although FIG. 1 functionally illustrates the processor, memory, and other elements of computer 110 as being within the same block, it will be understood by those of ordinary skill in the art that the processor and memory may actually comprise multiple processors and memories that may or may not be stored within the same physical housing. For example, memory may be a hard drive or other storage media located in a housing different from that of computer 110. Accordingly, references to a processor, computer, or memory will be understood to include references to a collection of processors or computers or memories that may or may not operate in parallel. Rather than using a single processor to perform the steps described herein some of the components such as steering components and deceleration components may each have their own processor that only performs calculations related to the component's specific function.

In various of the aspects described herein, the processor may be located remote from the vehicle and communicate with the vehicle wirelessly. In other aspects, some of the processes described herein are executed on a processor disposed within the vehicle and others by a remote processor, including taking the steps necessary to execute a single maneuver.

Computer 110 may all of the components normally used in connection with a computer such as a CPU, memory (e.g., RAM and internal hard drives) storing data 134 and instructions such as a web browser, an electronic display 142 (e.g., a monitor having a screen, a small LCD touch-screen or any other electrical device that is operable to display information), user input 140 (e.g., a mouse, keyboard, touch screen and/or microphone), as well as various sensors (e.g. a video camera) for gathering the explicit (e.g. a gesture) or implicit (e.g. "the person is asleep") information about the states and desires of a person.

Figure 2:
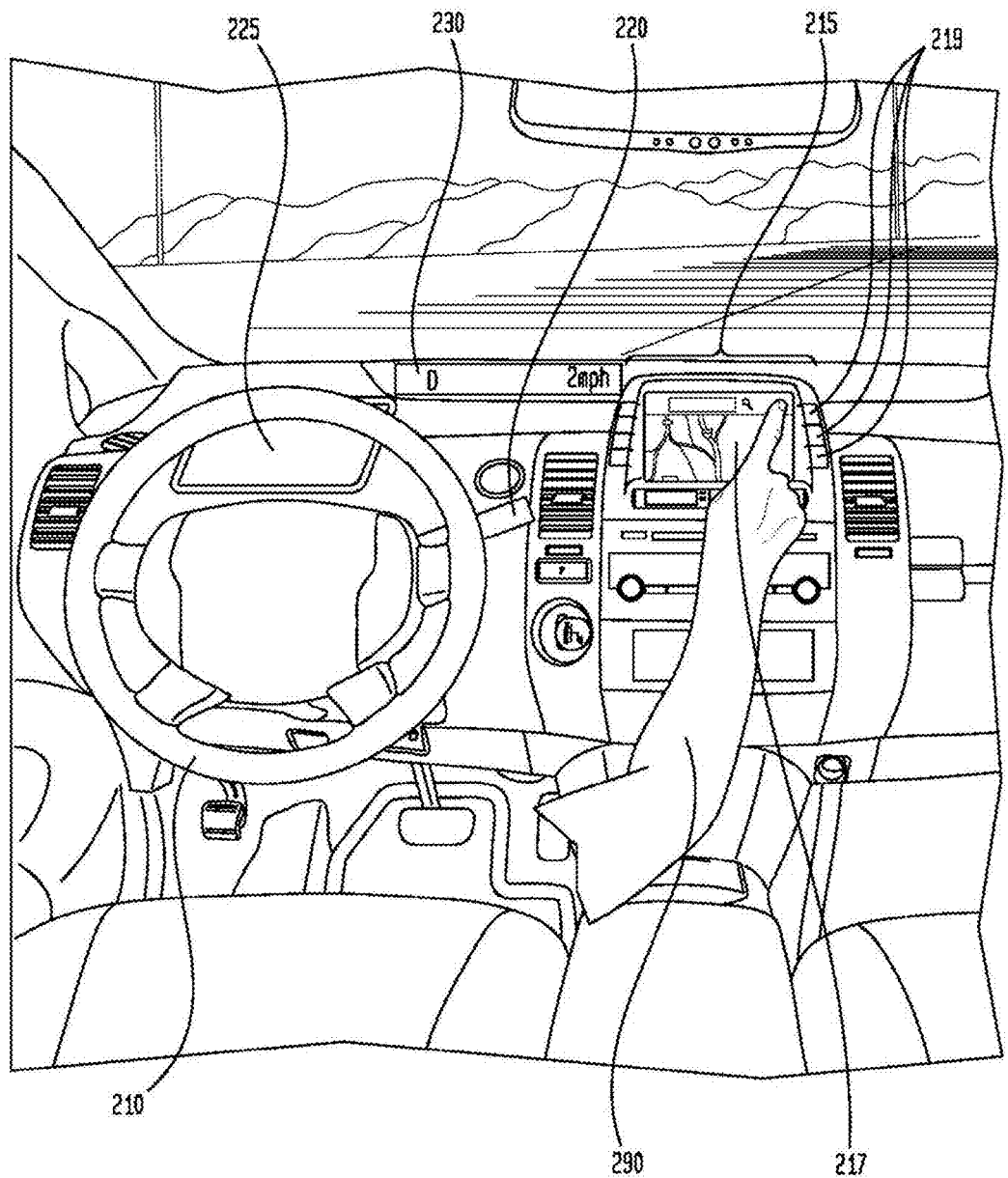
FIG. 2 is an interior of an autonomous vehicle in accordance with an exemplary embodiment.

In one example, computer 110 may be an autonomous driving computing system incorporated into vehicle 101. FIG. 2 depicts an exemplary design of the interior of an autonomous vehicle. The autonomous vehicle may include all of the features of a non-autonomous vehicle, for example: a steering apparatus, such as steering wheel 210; a navigation display apparatus, such as navigation display 215; and a gear selector apparatus, such as gear shifter 220. The vehicle may also have various user input devices, such as gear shifter 220, touch screen 217, or button inputs 219, for activating or deactivating one or more autonomous driving modes and for enabling a driver or passenger 290 to provide information, such as a navigation destination, to the autonomous driving computer 110.

Vehicle 101 may also include one or more additional displays. For example, the vehicle may include a display 225 for displaying information regarding the status of the autonomous vehicle or its computer. In another example, the vehicle may include a status indicating apparatus 138 (see FIG. 1), such as status bar 230, to indicate the current status of vehicle 101. In the example of FIG. 2, status bar 230 displays "D" and "2 mph" indicating that the vehicle is presently in drive mode and is moving at 2 miles per hour. In that regard, the vehicle may display text on an electronic display, illuminate portions of vehicle 101, such as steering wheel 210, or provide various other types of indications.

The autonomous driving computing system may capable of communicating with various components of the vehicle. For example, returning to FIG. 1, computer 110 may be in communication with the vehicle's conventional central processor 160 and may send and receive information from the various systems of vehicle 101, for example the braking 180, acceleration 182, signaling 184, and navigation 186 systems in order to control the movement, speed, etc. of vehicle 101. In addition, when engaged, computer 110 may control some or all of these functions of vehicle 101 and thus be fully or merely partially autonomous. It will be understood that although various systems and computer 110 are shown within vehicle 101, these elements may be external to vehicle 101 or physically separated by large distances.

The vehicle may also include a geographic position component 144 in communication with computer 110 for determining the geographic location of the device. For example, the position component may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The vehicle may also include other features in communication with computer 110, such as an accelerometer, gyroscope or another direction/speed detection device 146 to determine the direction and speed of the vehicle or changes thereto. By way of example only, device 146 may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the user, computer 110, other computers and combinations of the foregoing.

The computer may control the direction and speed of the vehicle by controlling various components. By way of example, if the vehicle is operating in a completely autonomous mode, computer 110 may cause the vehicle to accelerate (e.g., by increasing fuel or other energy provided to the engine), decelerate (e.g., by decreasing the fuel supplied to the engine or by applying brakes) and change direction (e.g., by turning the front two wheels).

Figure 3:
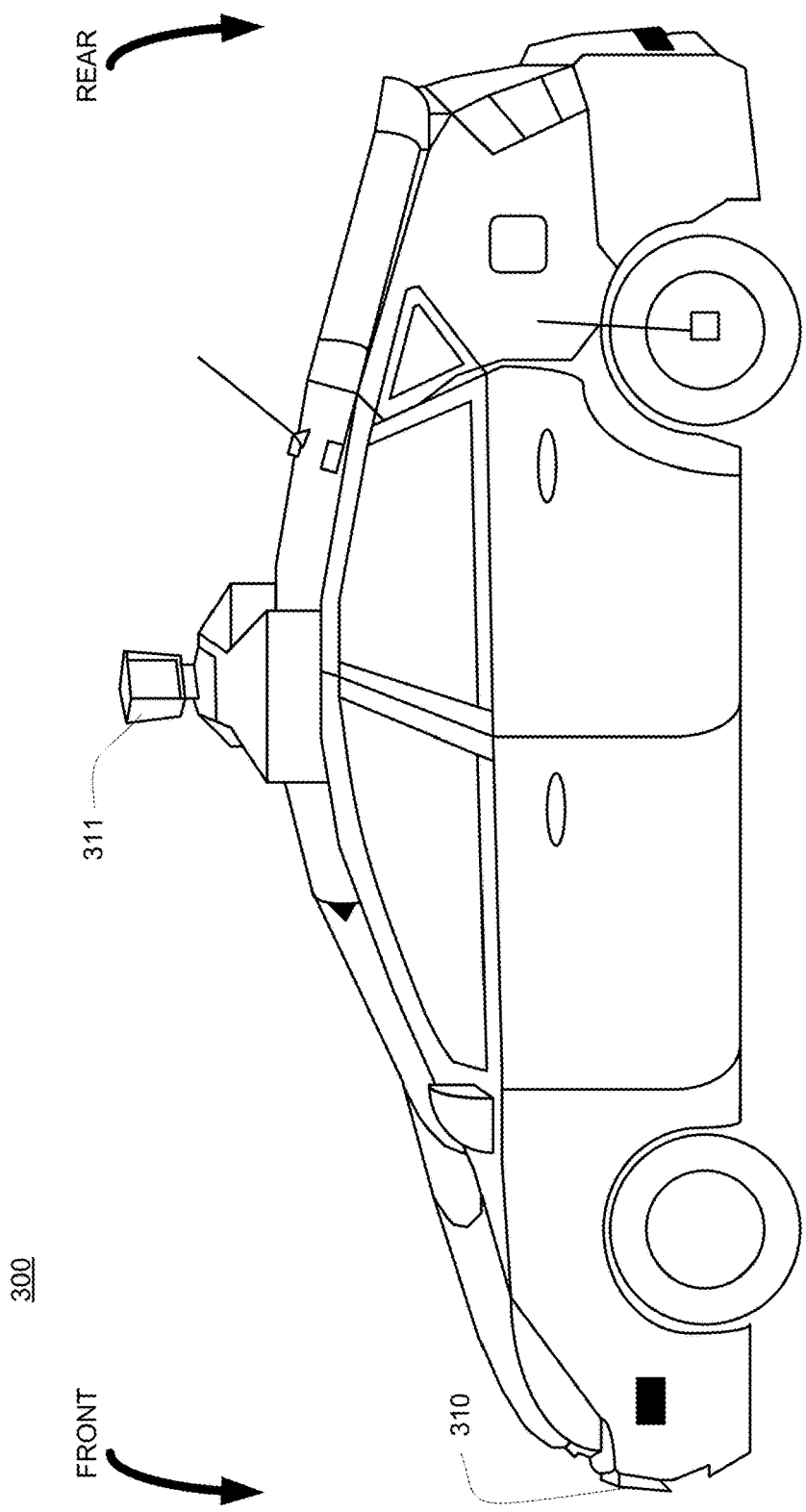
FIG. 3 is an exterior of an autonomous vehicle in accordance with an exemplary embodiment.

The vehicle may also include components for detecting objects external to the vehicle such as other vehicles, obstacles in the roadway, traffic signals, signs, trees, etc. The detection system may include lasers, sonar, radar, cameras or any other detection devices which record data which may be processed by computer 110. For example, if the vehicle is a small passenger vehicle, the car may include a laser mounted on the roof or other convenient location. As shown in FIG. 3, small passenger vehicle 300 may include lasers 310 and 311, mounted on the front and top of the vehicle, respectively. The lasers may include commercially available lasers such as the Velodyne HDL-64 or other models. In one example, laser 310 may have a range of 150 meters, a thirty degree vertical field of view, and a thirty degree horizontal field of view. Laser 311 may have a range of 50-80 meters, a thirty degree vertical field of view, and a 360 degree horizontal field of view. The laser may provide the vehicle with range and intensity information which the computer may use to identify the location and distance of various objects in the vehicles surroundings. In one aspect, the laser may measure the distance between the vehicle and the object surfaces facing the vehicle by spinning on its axis and changing its pitch.

The aforementioned sensors may allow the vehicle to understand and potentially respond to its environment in order to maximize safety for passengers as well as objects or people in the environment. It will be understood that the vehicle types, number and type of sensors, the sensor locations, the sensor fields of view, and the sensors' sensor fields are merely exemplary. Various other configurations may also be utilized.

In addition to the sensors described above, the computer may also use input from sensors typical of non-autonomous vehicles. For example, these sensors may include tire pressure sensors, engine temperature sensors, brake heat sensors, break pad status sensors, tire tread sensors, fuel sensors, oil level and quality sensors, air quality sensors (for detecting temperature, humidity, or particulates in the air), etc.

Many of these sensors provide data that is processed by the computer in real-time, that is, the sensors may continuously update their output to reflect the environment being sensed at or over a range of time, and continuously or as-demanded provide that updated output to the computer so that the computer can determine whether the vehicle's then-current direction or speed should be modified in response to the sensed environment.

In addition to processing data provided by the various sensors, the computer may rely on environmental data that was obtained at a previous point in time and is expected to persist regardless of the vehicle's presence in the environment. For example, returning to FIG. 1, data 134 may include detailed map information 136, e.g., highly detailed maps identifying the shape and elevation of roadways, lane lines, intersections, crosswalks, speed limits, traffic signals, buildings, signs, real time traffic information, or other such objects and information. For example, the map information may include explicit speed limit information associated with various roadway segments. The speed limit data may be entered manually or scanned from previously taken images of a speed limit sign using, for example, optical-character recognition. The map information may include three-dimensional terrain maps incorporating one or more of objects listed above. For example, the vehicle may determine that another car is expected to turn based on real-time data (e.g., using its sensors to determine the current GPS position of another car) and other data (e.g., comparing the GPS position with previously-stored lane-specific map data to determine whether the other car is within a turn lane).

Again, although the map information is depicted herein as an image-based map, the map information need not be entirely image based (for example, raster). For example, the map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Figure 4A:
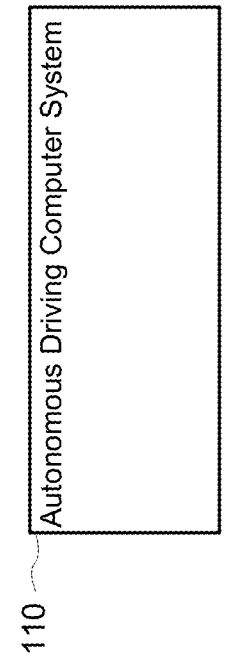
FIG. 4A is a pictorial diagram of a system in accordance with an exemplary embodiment.
Figure 4A:
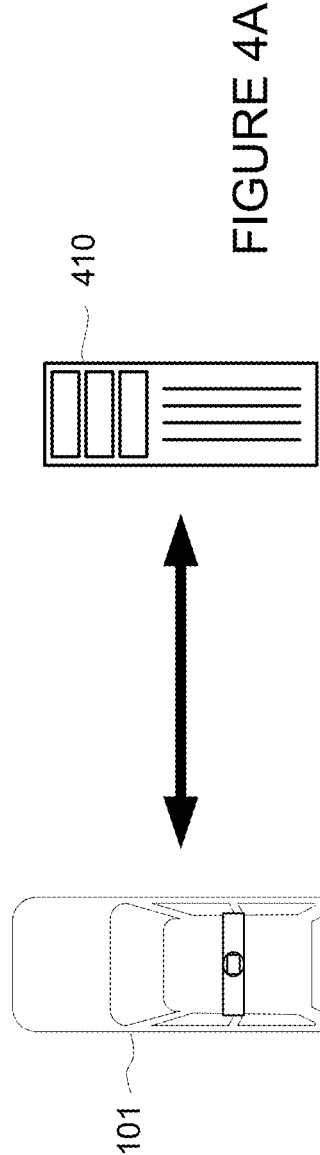
Figure 4B:
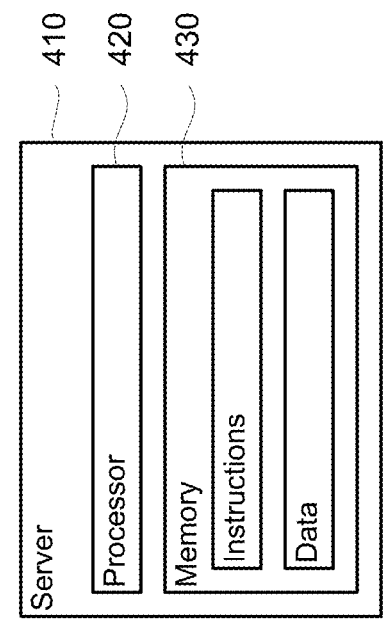
FIG. 4B is a functional diagram of a system in accordance with an exemplary embodiment.

The sensor data and stored by computer 110 may be processed as described herein by computer 110 or may be transferred to other computers for further processing. For example, as shown in FIGS. 4A and 4B, data from computer 110 may be transmitted via a network to computer 410 for further processing. The network, and intervening nodes, may comprise various configurations and protocols including the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computers, such as modems (e.g., dial-up, cable or fiber optic) and wireless interfaces. In another example, data may be transferred by storing it on memory which may be accessed by or connected to computer 410.

In one example, computer 410 may comprise a single server having a plurality of computers, e.g., a load balanced server farm, that exchange information with different nodes of a network for the purpose of receiving, processing and transmitting the data from computer 110. The server may be configured similarly to the computer 110, with a processor 420, memory 430, instructions, and data.

In addition to the operations described above and illustrated in the figures, various operations will now be described. It should be understood that the following operations do not have to be performed in the precise order described below. Rather, various steps can be handled in a different order or simultaneously, and steps may also be added or omitted.

In order to generate the detailed map information described above, data regarding the location and elevation of the roadway and landscape may be collected by the vehicle's sensors. For example, a vehicle including one or more lasers may be driven along a roadway. As the laser is moved along, it may collect data points including range and intensity information for the same location (point or area) from several directions and/or at different times. For example, each data point may include a location component and an elevation component: (x,y,z). For example, the x and y components of a data point may represent GPS coordinates or some other coordinate scheme, while the z component may represent a relative elevation. For example, the elevation z may be determined relative to sea level or some other reference point.

Figure 5:
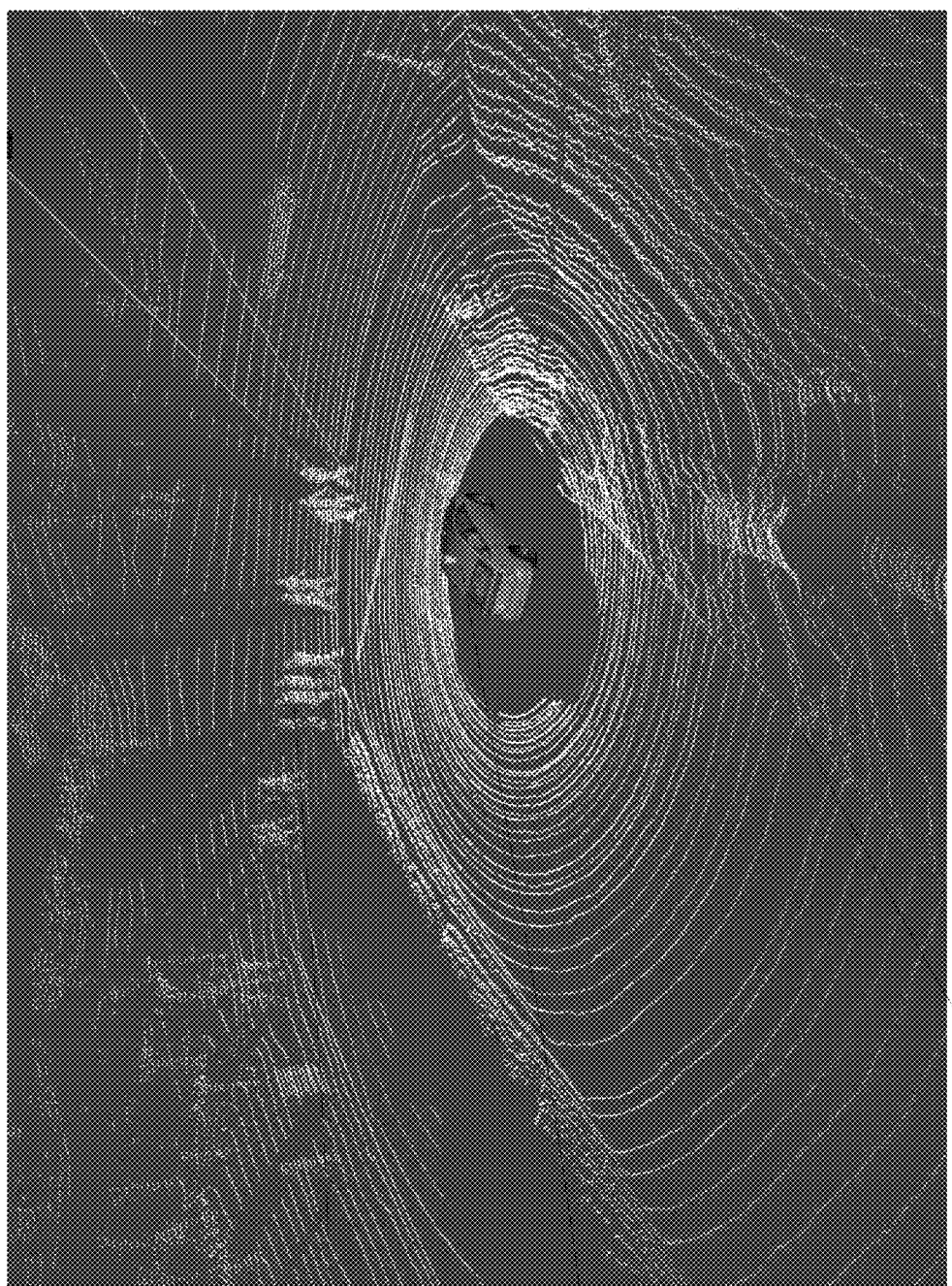
FIG. 5 is a diagram of laser data in accordance with an exemplary embodiment.

In one example, FIG. 5 depicts vehicle 300 approaching an intersection. The image was generated based on laser data collected by the vehicle's lasers for a single period of time. The white lines represent how the laser "sees" its surroundings. For example, the laser data may include the outline, shape and distance from vehicle 300 of various objects such as people 510 and curb 520.

As the vehicle continues to move along the roadway, the laser may take multiple measurements of a single geographic area. For example, a small patch of the roadway may be measured several times as the vehicle approaches the patch, passes the patch, and moves away from the patch. Thus, from a single pass, the laser information may include many different (intensity and range) data points for the same location. This data may be transferred to another computer for further processing as described above or processed at the vehicle. The data points may be processed to generate an elevation map of the roadway from the intensity and range information.

The laser data may then projected onto a 2D map grid corresponding to the section of roadway. For example, all of the data points for a given area may be projected into cells of the grid. The cells may be of various sizes, for example, 12 cm by 12 cm, or larger or smaller. In another example, the cells may vary slightly within the same grid. For example, the cell sizes may vary by the geographic position of the vehicle and depending upon the map projection of the map or map product used by the vehicle. The map projection may be lined up pixel for pixel with the vehicle's projection into the cells of the 2D grid. In some examples, the size of the grid pixels may vary with latitude (but not longitude). Thus, for example in the San Francisco Bay area, the size of the cells may be approximately 11-12 cm.

Figure 6A:
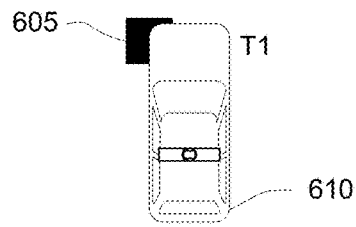
FIGS. 6A and 6B are vehicles in accordance with an exemplary embodiment.
Figure 6A:
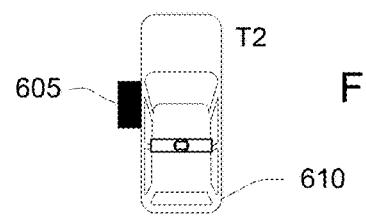
Figure 6B:
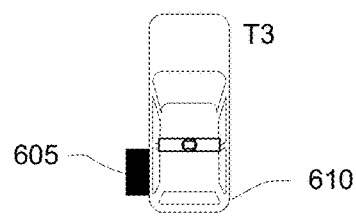
Figure 6B:
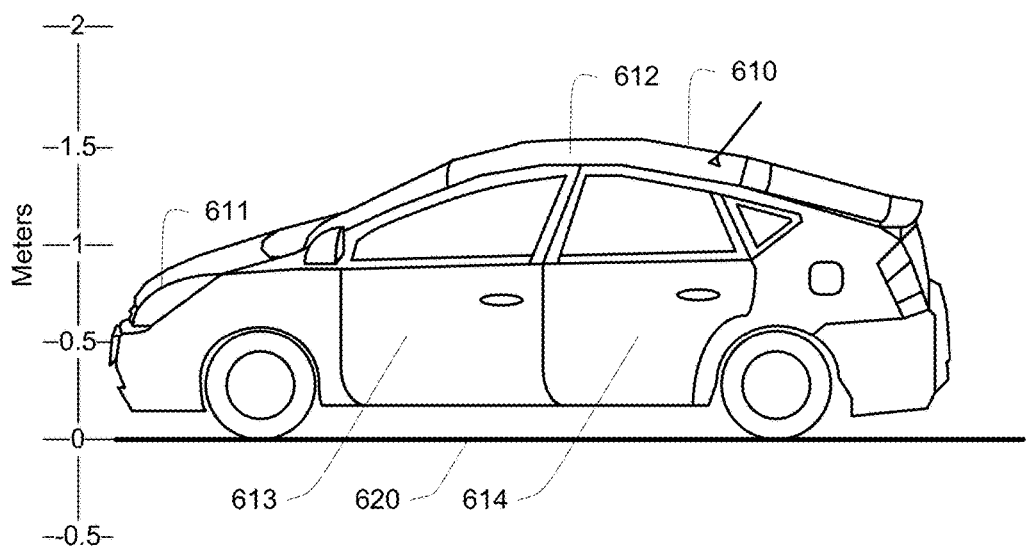

Each cell may contain data points generated from different portions of the roadway and surrounding areas. For example, as the driver's side of vehicle 610 passes over the area of roadway corresponding to a particular cell, measurements may be collected for a range of different heights. For example, different sections of the vehicle may pass over cell 605 at different times (T1, T2, and T3) as shown in FIG. 6A. Thus, referring to FIG. 6B, the same cell may include a data point from the top of a headlight 611 at about 0.6 meters, the top of the roof 612 at about 1.45 meters, the driver and passenger doors 613-614 at between about 0.15 and 0.8 meters, etc. (all relative to the roadway 620). The same cell may also have several measurements of the elevation of the area of roadway. Accordingly a cell of 12 cm by 12 cm may have from 0 to several hundred or more data points depending upon the number of passes through the area, speed of the laser (and vehicle), etc.

Figure 7:
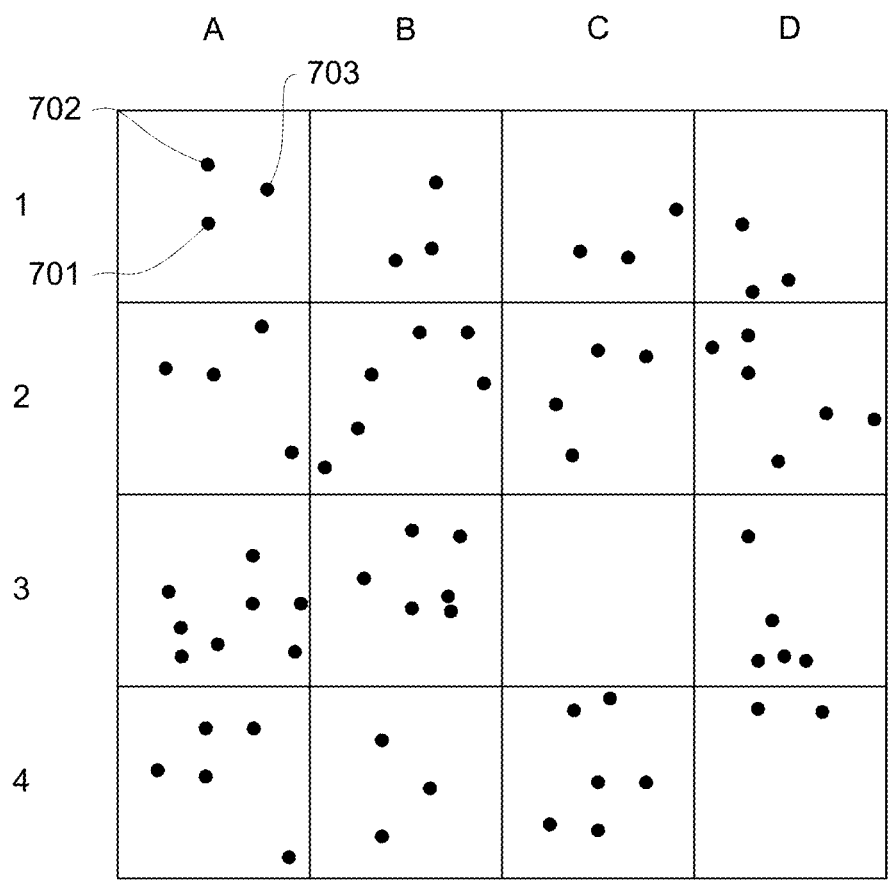
FIG. 7 is a diagram of data points in accordance with an exemplary embodiment.

FIG. 7 depicts an exemplary 2D grid 700 with 16 cells representing a small portion of a roadway. Each cell of the exemplary grid may represent an approximate 1.7 cm by 1.7 cm rectangle corresponding to a particular 1.7 cm by 1.7 cm area of the Earth. The cells may each be associated with an identifier, for example, A1, B1, etc. The identifiers may also represent geographic locations, for example latitude and longitude of a particular point within a cell or the range of latitudes and longitudes within the geographic location of a cell. The identifiers may correspond to a geographic location, for example, a section of a roadway. Each of the cells may include the data points collected by the laser. For example, cell A1 includes data points 701-703. Again, each data point may represent a geographic location with respect to the cell (and the earth) as well as an elevation (x, y, z). As discussed above, many more data points may be included in each particular cell, but only a few data points are shown in FIG. 7 for clarity and ease of understanding. For example, cell A1 includes 3 data points, B2 includes 6 data points, and cell C3 includes no data points.

Figure 8A:
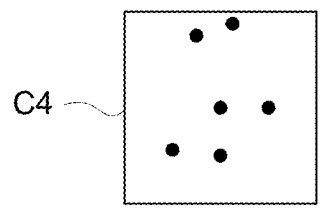
FIGS. 8A and 8B are diagrams of data points in accordance with an exemplary embodiment.
Figure 8B:
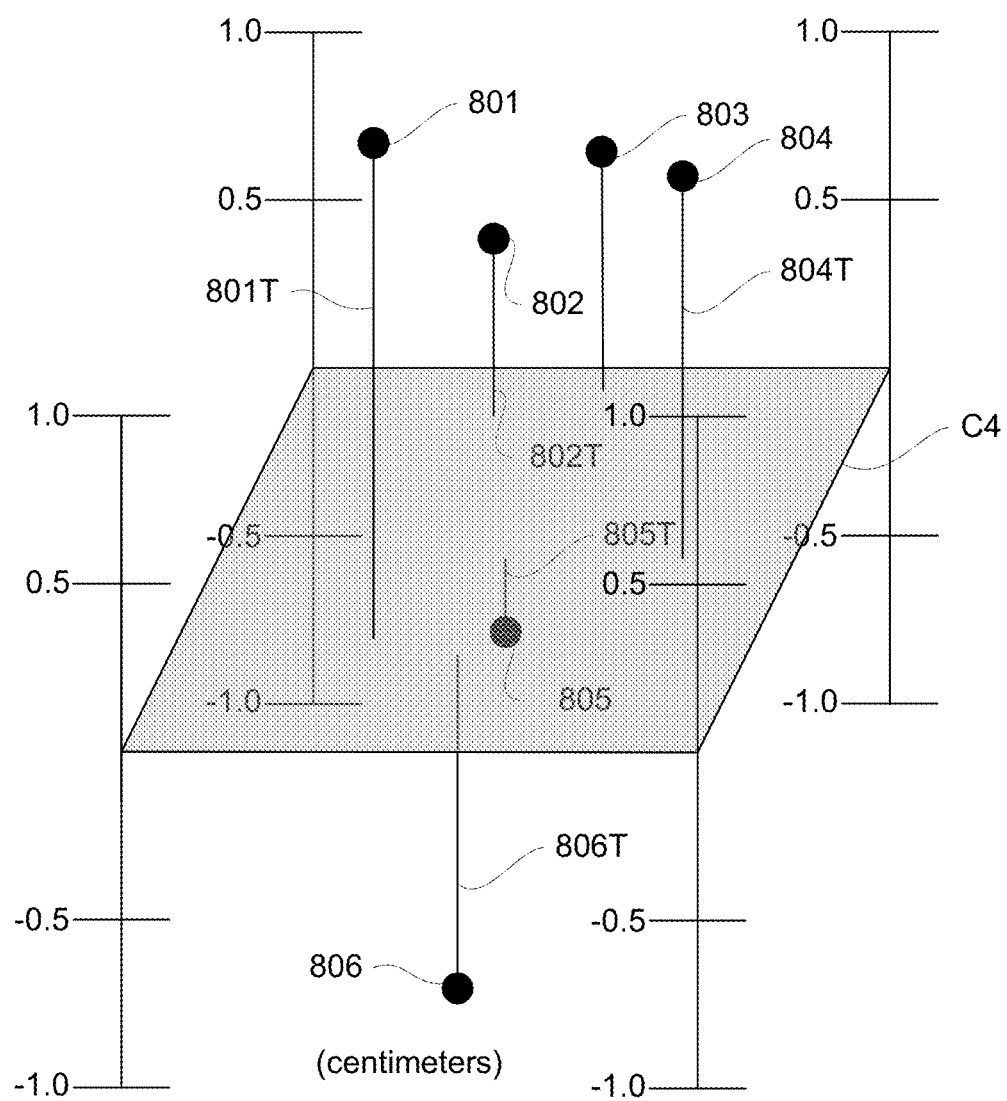

FIG. 8A depicts a 2D representation of the data contained in cell C4 of FIG. 7. FIG. 8B is a 3D representation of the data points of cell C4. For example, cell C4, includes data points 801-806. The tails 801T-806T extend from each point towards its respective location on the cell C4 and also identify the respective elevation of the data point, or rather the approximate distance above or below a reference associated with the cell C4. Thus the relative elevation of each particular data point in a cell may be calculated based on the shortest distance from the particular data point to the reference. As noted above, the reference may represent sea level for the geographic area associated with the cell. It will be understood that while a plane is used as a reference in the example of FIG. 8, the reference may also be a series of distinct points or a curved surface, for example, to account for the curvature of the Earth and the changes in sea level within a particular cell.

Returning to the example of FIG. 8, data point 801 is approximately 1.5 cm above the reference plane, data point 802 is approximately 0.5 cm above the reference plane of cell C4, data point 803 is approximately 0.75 cm above the reference plane of cell C4, data point 804 is approximately 1 cm above the reference plane of cell C4, data point 805 is approximately 0.25 cm below the reference plane of cell C4, and data point 806 is approximately 1.0 cm below the reference plane of cell C4

For each particular cell of the grid, the data points may be processed to remove outliers. In one example, points which are more than a threshold deviation from the average elevation may also be removed. Returning to FIG. 8B, the average elevation of all of the data points would be 0.41 cm above the reference plane of cell C3. The average deviation, σ, of the data points would be 0.70 cm. If the threshold deviation is 2σ, then any points which are more than 1.40 from the average elevation may be removed. Thus, data point 806 may be removed from cell C3. Accordingly, the new average elevation for the cell would be 0.70 cm above the reference plane of cell C3.

In another example, the data points in a particular cell may be filtered based on occlusion. While various occlusion methods may be used, in one example the data collected by the laser may be filtered based on the distance from the vehicle. For example, only data points very close to the vehicle may be used. This may filter measurements (data points) that are only visible from a distance, such as the bottom of an overpass.

Outlier points may also be removed by interpolating from data in neighboring cells. For example, if the average elevation for cells B4 and D4 of FIG. 7 is 0.90 cm, data points of cell C4 which are more than some threshold deviation above or below this elevation may also be removed. For example, if the threshold deviation is 1.0 cm, then data points 805 and 806 may be removed from cell C4 and the average elevation of the cell would be 0.94 cm.

Further, if there is a lack of data in a particular cell, data in nearby cells may be used to extrapolate and fill data in the particular cell. For example, cell C4 of FIG. 7 includes no data points. Data from neighboring cells including all or less than all of cells B2, B3, B4, C2, C4, D2, D3, D4, may be used to identify an elevation for cell C4. For example, after outliers have been removed from cells B2 and D4, the average elevation between these two particular cells may be used as an estimated elevation for cell C4. In another example, rather than simply taking the average elevation of nearby cells, the average elevation of the remaining data points with the lowest relative elevation may be used to generate the estimated elevation. This estimated elevation may then be used to generate an estimated data point for the cell or alternatively, the estimated elevation may simply be associated with the particular cell.

The minimum value of the remaining data points within each cell may then be selected as the elevation for the particular cell. For example, the data points for each cell may be evaluated to identify the data point associated with the lowest elevation. As described above, the relative elevation of each identified data point may be calculated by converting the elevation of the selected point to a relative distance from a reference point. This relative elevation may be assumed to be the closest to the actual roadway or areas around the roadway (the ground). The elevation of a plurality of cells may then be used to generate an elevation map of the roadway.

Figure 9:
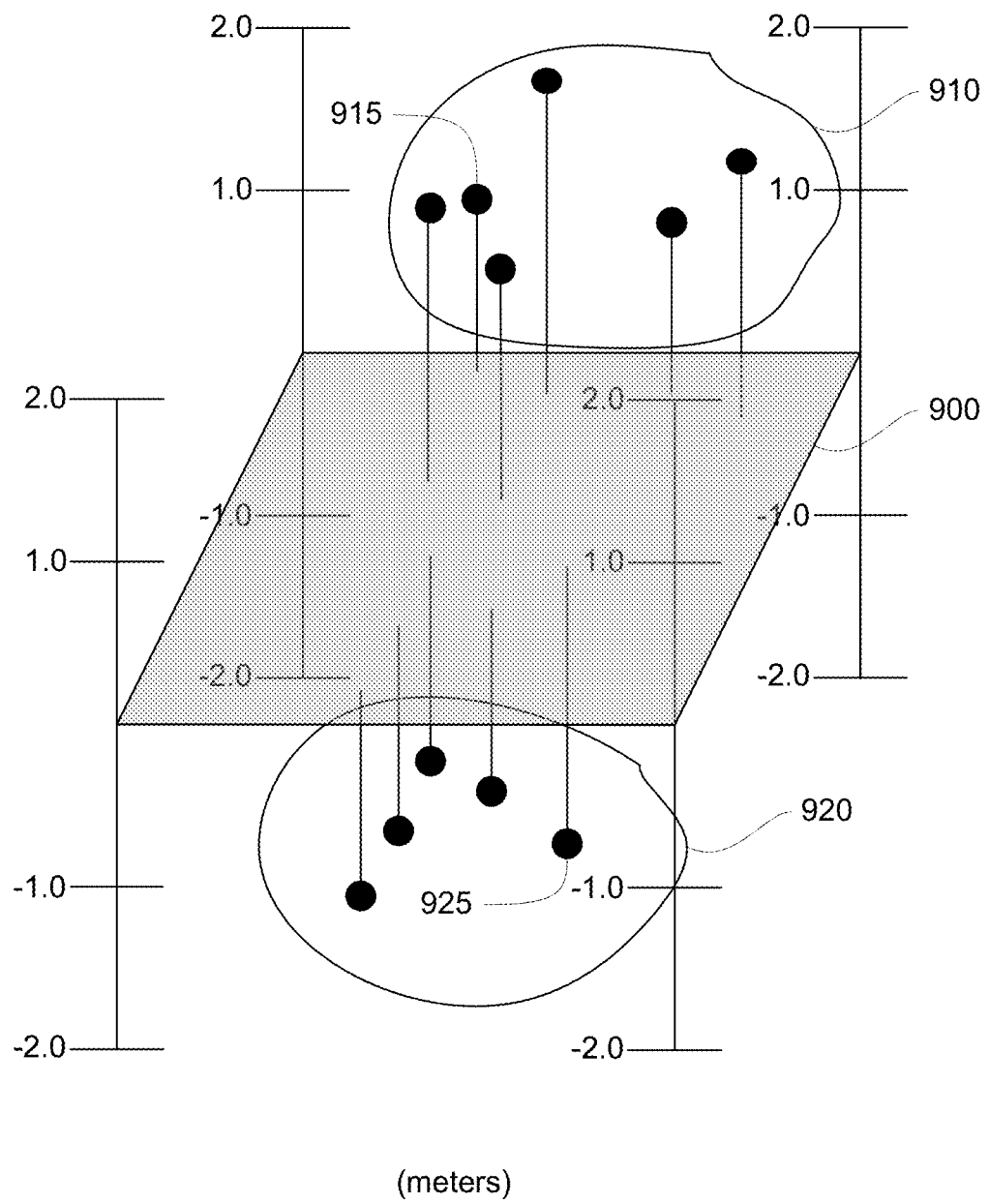
FIG. 9 is a diagram of data points in accordance with an exemplary embodiment.

In some examples, data points within a cell may be clustered around two locations. These double clusters may be used to differentiate between two surfaces. The clusters may be identified manually or by various clustering algorithms may be used to detect multi-model distribution, such as fitting a Gaussian mixture model using an expectation-maximization algorithm. FIG. 9 depicts a cell 900 after being filtered as described above. In this example, the scale of the reference lines is in meters. The data points of cell 900 are arranged into two distinct clusters, higher relative cluster 910 and lower relative cluster 920. For example, a lower relative cluster may be associated with a roadway and a higher relative cluster may be associated with an overpass (over the roadway). These multiple surfaces may be identified as two different levels or elevations within the same cell. Here, rather than using the minimum value of the remaining data points within the cell, the minimum value for each cluster may be used. In this example, the minimum value of cluster 910 is may be associated with data point 915, while the minimum value of cluster 920 may be associated with data point 925. Thus, cell 900 may be associated with two minimum data points or two different levels. When cell 900 is used to generate the elevation map, the geographic area corresponding to cell 900 may thus be associated with two different levels or elevations.

This may then be transferred to cars to be used to detect objects in the laser data, localize the vehicle in elevation, identify static objects (objects expected to appear each time the vehicle passes such as trees, buildings, curbs, traffic signals, etc.), using elevation to determine the slope and bank of a road to increase the smoothness of steering, and direct the use of sensors (pointing a detecting portion of a sensor up or downhill depending on the elevation of the roadway).

If the elevation map identifies two surfaces for a given cell area, this information may also be used to detect objects and navigate the vehicle. For example, a vehicle traveling under an overpass does not need to know the exact features of the overpass. Thus, rather than loading data for both levels of the map, the autonomous driving computer may pull only data for the level on which the vehicle is currently driving or approaching. A vehicle's current level may be determined by using preflagged zones of a roadgraph. For example, a flag may be associated with an exit ramp from a highway overpass (a higher roadway) to a roadway passing under the highway (a lower roadway). In this example, the higher roadway and lower roadway may each be associated with different elevation data at the same latitude and longitude coordinates. A flagged zone may be defined by latitude-longitude pairs representing transition polygons or areas between the higher roadway and the lower roadway. When the vehicle travels through such a zone, the map and elevation data associated with the level of the destination may be loaded and used by the vehicle as described above.

The elevation map may also be used when generating road vector maps.

Figure 10:
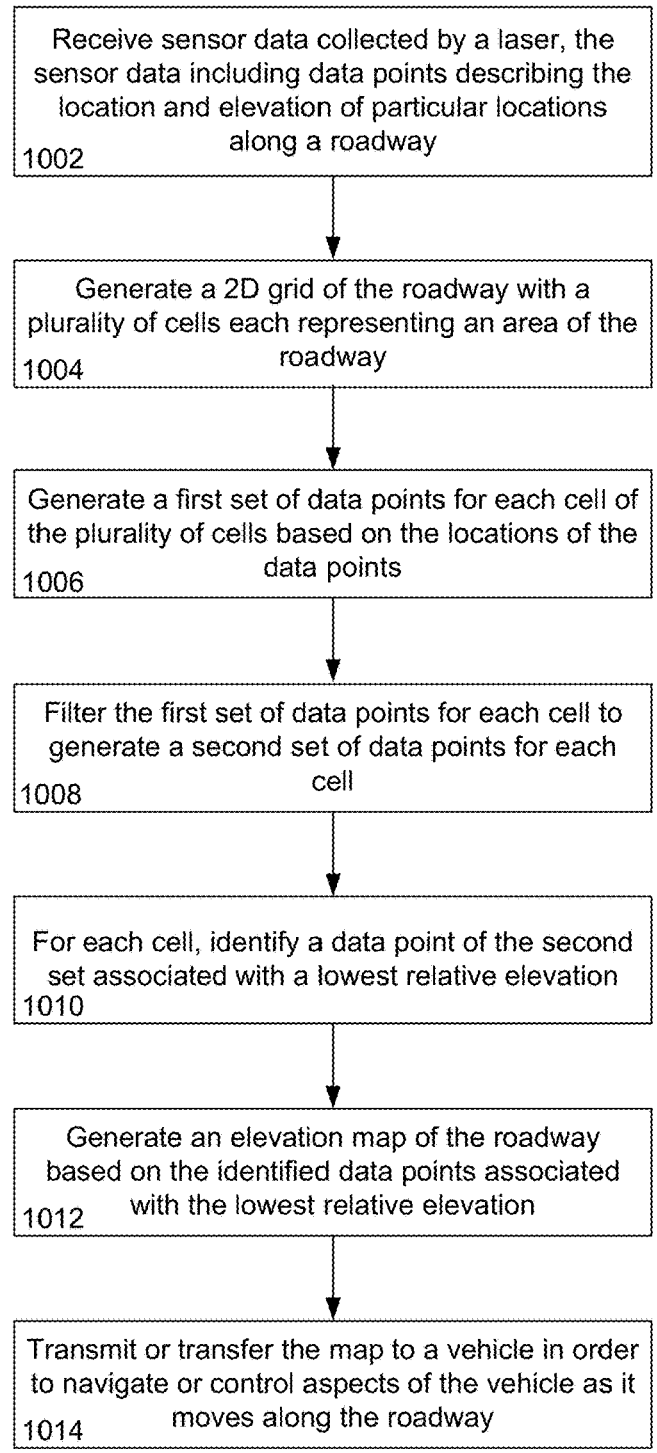
FIG. 10 is a flow diagram in accordance with an exemplary embodiment.

Flow diagram 1000 of FIG. 10 depicts an exemplary embodiment of the process described above. At block 1002, a computer receives sensor data collected by a laser. The sensor data includes data points describing the location and elevation of particular locations along a roadway. A 2D grid of the roadway with a plurality of cells is generated at block 1004. Each cell of the plurality of cells represents an area of the roadway. The data points are then sorted into the cells based on their location, or a first set of data points for each cell of the plurality of cells is generated based on the locations of the data points at block 1006. The first set of data points for each cell is then filtered using various methods to generate a second set of data points for each cell at block 1008. For each cell, a data point of the second set associated with a lowest relative elevation is identified at block 1010. The identified data points associated with the lowest relative elevation are then used to generate an elevation map of the roadway at block 1012. The elevation map may be transmitted or otherwise transferred to a vehicle, in some examples an autonomous vehicle, in order to navigate or control aspects of the vehicle as it moves along the roadway at block 1014.

As these and other variations and combinations of the features discussed above can be utilized without departing from the subject matter as defined by the claims, the foregoing description of exemplary embodiments should be taken by way of illustration rather than by way of limitation of the subject matter as defined by the claims. It will also be understood that the provision of the examples described herein (as well as clauses phrased as "such as," "e.g.", "including" and the like) should not be interpreted as limiting the claimed subject matter to the specific examples; rather, the examples are intended to illustrate only some of many possible aspects.

The invention claimed is:

1. A method comprising:
receiving a plurality of data points via one or more sensors, each data point representing a position and an elevation of one or more roadways; and
determining, based on the elevation of at least one data point of the plurality of data points relative to the elevation of at least one other data point of the plurality of data points, and using one or more computing devices, whether the position corresponds with both a lower roadway and a higher roadway;
when the position is determined to correspond with both a lower roadway and a higher roadway:
generating, using the one or more computing devices and based on the plurality of data points, a map that associates the position with both the lower roadway and the higher roadway, and
associating, using the one or more computing devices, a zone of a roadway with a value, wherein the value indicates the zone is an area of transition between the higher roadway and the lower roadway, and wherein an autonomous vehicle may determine whether the autonomous vehicle is currently on the higher roadway or the lower roadway based on the autonomous vehicle travelling through the zone associated with the value.

2. The method of claim 1 wherein the area of transition between the higher roadway and the lower roadway is an exit ramp from a highway.

3. The method of claim 1 wherein the zone is determined based on a polygon defined by latitude and longitude positions.

4. The method of claim 1 wherein the position that is determined to correspond with both a lower roadway and a higher roadway comprises a position at an overpass.

5. The method of claim 1 wherein determining whether a position corresponds with a lower roadway comprises:
determining a plurality of portions of a surface of the lower roadway,
identifying, for each portion of the surface, a plurality of data points associated with the elevation of a plurality of positions in the portion, and
determining the elevation of each portion based on the data point associated with the lowest elevation.

6. The method of claim 5 wherein determining whether a position corresponds with a higher roadway comprises receiving a cluster of data points representing an elevation higher than the elevation determined for at least one portion of the plurality of portions.

7. The method of claim 1 wherein the one or more sensors comprises one or more lasers.

8. A system for generating a map of a roadway, the system comprising:
one or more computing devices, and
memory storing instructions, the instructions being executable by the one or more computing devices,
wherein the instructions comprise:
accessing at least a portion of a roadgraph having a first roadway, a second roadway and a third roadway,
a given position of the roadgraph being associated with a plurality of levels, one of the plurality of levels being an upper level comprising the first roadway and one of the plurality of levels being a lower level comprising the second roadway, wherein the second roadway passes under the first roadway at the given position, and
the third roadway having a transition zone, wherein the transition zone is associated with a value that indicates the transition zone is a transition from one level to another level;
determining a position of an autonomous vehicle on route to a destination;
determining, based on the position of the autonomous vehicle, whether the autonomous vehicle is travelling through the transition zone;
when the autonomous vehicle is determined to be travelling through the transition zone, determining whether the destination is associated with upper level or the lower level;
navigating the autonomous vehicle based on the roadgraph of the first roadway when the destination is determined to be associated with the upper level; and
navigating the autonomous vehicle based on the roadgraph of the second roadway when the destination is determined to be associated with the lower level.

9. The system of claim 8 wherein the transition zone is between the first roadway and the second roadway is an exit ramp from a highway.

10. The system of claim 8 wherein determining whether the autonomous vehicle is travelling through the transition zone comprises determining whether the position of the autonomous vehicle corresponds with a polygon stored in memory and defined by latitude and longitude positions.

11. The system of claim 8 wherein the given position comprises a position at a highway overpass.

12. The system of claim 8 wherein the instructions further comprise loading the roadgraph of the first roadway in response to the autonomous vehicle travelling through the transition zone from the second roadway.

13. The system of claim 12 wherein the instructions further comprise loading the roadgraph of the second roadway in response to the autonomous vehicle travelling through the transition zone from the first roadway.

14. The system of claim 8 wherein the one or more computing devices are disposed in the autonomous vehicle.

15. A method comprising:
accessing, using one or more computing devices, a roadgraph comprising a first roadway, a second roadway and a third roadway,
a given position of the roadgraph being associated with a plurality of levels, one of the plurality of levels being an upper level comprising the first roadway and one of the plurality of levels being a lower level comprising the second roadway, wherein the second roadway passes under the first roadway at the given position, and
the third roadway having a transition zone, wherein the transition zone is associated with a value that indicates the transition zone is a transition from one level to another level;
determining, using the one or more computing devices, the position of an autonomous vehicle on route to a destination;
determining, using the one or more computing devices and based on a position of the autonomous vehicle, whether the autonomous vehicle is travelling through the transition zone;
when the autonomous vehicle is determined to be travelling through the transition zone, determining, using the one or more computing devices, whether the destination is associated with upper level or the lower level;
navigating, using the one or more computing devices, the autonomous vehicle based on the roadgraph of the first roadway when the destination is determined to be associated with the upper level; and navigating, using the one or more computing devices, the autonomous vehicle based on the roadgraph of the second roadway when the destination is determined to be associated with the lower level.

16. The method of claim 15 wherein the transition zone is between the first roadway and the second roadway is an exit ramp from a highway.

17. The method of claim 15 wherein determining whether the autonomous vehicle is travelling through the transition zone comprises determining whether the position of the autonomous vehicle corresponds with a polygon stored in memory and defined by latitude and longitude positions.

18. The system of claim 15 wherein the one or more computing devices are disposed in the autonomous vehicle.

19. The method of claim 15 wherein the method further comprises loading the roadgraph of the first roadway in response to the autonomous vehicle travelling through the transition zone from the second roadway.

20. The method of claim 19 further comprising loading the roadgraph of the second roadway in response to the autonomous vehicle travelling through the transition zone from the first roadway.

\* \* \* \* \*